US005931080A

United States Patent [19]

Roure Boada

[11] Patent Number: 5,931,080

[45] Date of Patent: Aug. 3, 1999

[54] ESPRESSO COFFEE MACHINE PROVIDED WITH A DEVICE FOR WHIPPING MILK

[75] Inventor: Jorge Roure Boada, Barcelona, Spain

[73] Assignee: Gaggia Esponola, SA, Barcelona, Spain

[21] Appl. No.: 08/804,486

[22] Filed: Feb. 21, 1997

[30] Foreign Application Priority Data

Feb. 22, 1996 [ES] Spain .................................... 9600415

[51] Int. Cl.[6] ................................................ A47J 31/40

[52] U.S. Cl. .................... 99/293; 99/323.1; 261/DIG. 76

[58] Field of Search ............................ 99/286, 293, 294, 99/290, 323.1; 261/121.1, DIG. 16, DIG. 76

[56] References Cited

U.S. PATENT DOCUMENTS

| | | | |
|---|---|---|---|
| 4,852,474 | 8/1989 | Mahlich et al. | 99/293 |
| 4,922,810 | 5/1990 | Siccardi | 99/293 X |
| 4,945,824 | 8/1990 | Borgmann | 99/293 |
| 4,949,631 | 8/1990 | Fregan | 99/452 |
| 5,265,520 | 11/1993 | Giulano | 99/293 X |
| 5,372,061 | 12/1994 | Albert et al. | 99/293 X |
| 5,638,740 | 6/1997 | Cai | 99/293 X |

FOREIGN PATENT DOCUMENTS

| | | |
|---|---|---|
| 0344859 | 12/1989 | European Pat. Off. . |
| 0467666 | 1/1992 | European Pat. Off. . |
| 0575762 | 12/1993 | European Pat. Off. . |

OTHER PUBLICATIONS

WO 91/00041, PCT/EP90/00122, Jan. 10, 1991.

*Primary Examiner*—Reginald L. Alexander
*Attorney, Agent, or Firm*—Lyon & Lyon LLP

[57] ABSTRACT

Espresso coffee machine provided with a device for whipping milk. It includes at least a coffee dispenser (5) and a whipping device (19) inserted in the stream supplying duct (9). The stream supplying is integral with a member rotatory about a vertical shaft surrounding an annular chamber of the steam distributing body (18) fixed on the housing (1) and connected to the steam supply (**2*a*) from the drum (32) and to the stream (9), this latter being horizontally rotatable to locate itself close to the coffee pouring peak (4) on the tray (31) or outside the tray. In the drum (32) there are two hot water (3*a*) and stream (2*a*) intake ducts with electrically operated valves (2), (3) which converges at the distributor (8**). The electrically operated valves are related with an electronic circuit, several timers and push buttons to select: coffee plus steam according to two different doses, steam in a timed way, steam in a continuous way and hot water in a continuous way for cleaning.

8 Claims, 3 Drawing Sheets

2 2a 3 3a 1 32 6 7 8 5 9 20 10 19 4 4a 18 19a 22 21 31

ESPRESSO COFFEE MACHINE PROVIDED WITH A DEVICE FOR WHIPPING MILK

BACKGROUND OF THE INVENTION

This invention refers to an espresso coffee machine, with which one can prepare other infusions, with one or several coffee dispensing groups, having automatic and/or manual cycles and provided with an emulsifying device, in general a Venturi, for whipping milk, to prepare the so-called Italian cappuccino coffee, which device for whipping is arranged inserted in at least one of the ducts supplying steam to the machine, adopting a tubular structure and incorporating air suction passage, a milk suction intake from a side nozzle to which a flexible duct is connected which is associated to a milk container and a mixing chamber, in such a way that through the depression originated at the Venturi by means of the steam which flows through it the sucked air and milk meet each other and are mixed at the duct diffusion area with the hot steam producing a triple mixture, steam-air-milk, necessary to form the milk foam which is obtained at the steam duct outlet, through a dispensing nozzle.

Different embodiments of above device for whipping milk and the association thereof to an espresso coffee machine are disclosed in namely documents U.S. Pat. No. 4,949,631, EP-A-344859, EP-A-467666 and EP-A-575762. Patent EP-A-480928 discloses an automatic machine to supply black coffee, and the like, where an emulsifying device connected to a steam generator appears disclosed, wherein it is foreseen that the coffee supplying device and the milk supplying device are provided with respective very closely fixed distributing taps for directly supplying to the cup.

Summary of the Invention

This invention has the object of providing an espresso coffee machine with a device for whipping milk, of the type already known, associated to a steam supply duct, which has a movement which allows to locate the whipping milk dispensing nozzle close to the coffee distributing tap of one of the machine groups, to directly and simultaneously supply coffee and whipped milk to the cup, to an area away from said group, to only pour whipped milk to a cup or to an area outside the front tray which collects the machine wastes in order to fill a container such as a jug or a large vessel with whipped milk. In addition, according to the invention, the selective supply of hot water has been foreseen toward said steam duct provided with the whipping device to achieve a very effective cleaning of the whipping and suction duct assembly, which has to be removed beforehand from the milk container.

The above and other objects, advantages and features of the present invention will become more apparent from the following description of certain preferred embodiments thereof.

The invention will now be described in detail with reference to the accompanying drawings wherein:

BRIEF DESCRIPTION OF THE DRAWINGS

FIGS. 3, 4, 5 and 6 schematically show the different possibilities of performance of the whipping device by dispensing whipped milk respectively to a cup simultaneously with dispensing one or two coffee cups, to an area away from that of coffee direct supply and another external area of the machine for filling a large container such as a jug and the like.

DETAILED DESCRIPTION OF THE PREFERRED EMBODIMENTS

Figure 1:
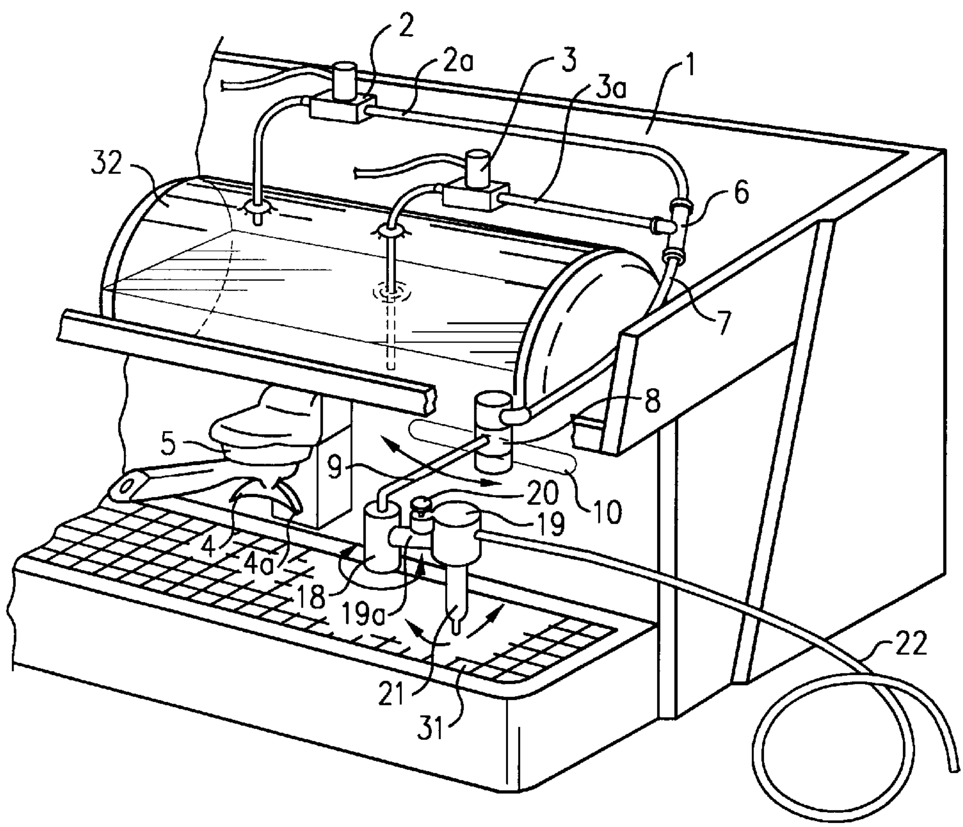
FIG. 1 is a view in part perspective of a coffee machine in which some walls have been eliminated to have a best view of the machine internal organs, related to the invention. Also the machine steam drum was assumed to be transparent to more clearly show the introduction of the steam and water supply ducts.

According to above figures, the espresso coffee machine with a device for whipping milk, object of this invention, is constituted by a conventional machine 1 which includes two electrically operated valves 2, 3 associated to ducts for steam exhaust 2*a* and hot water exit 3*a*, respectively, as well as coffee supply nozzles 4, 4*a*, for one or two cups from a ladle-holder 5. Characteristic of this invention is the fact that the steam exhaust 2*a* and hot water exit 3*a* ducts from a steam drum 32 (see FIG. 1) remain connected to a T part 6, with the third exit duct thereof 7 deriving toward a distributing body 8 installed within the machine, close to its front wall and provided with a steam exhaust duct 9 which emerges outwardly from the machine through an oblong window 10 of said front part.

Figure 2:
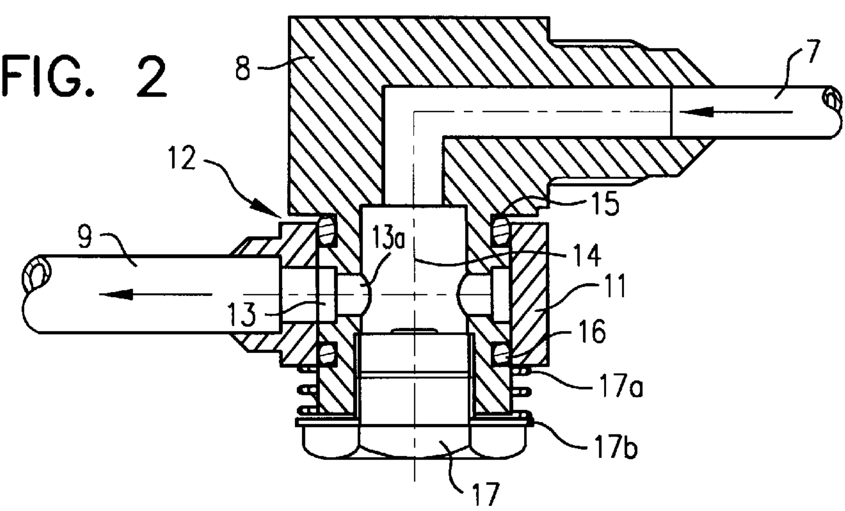
FIG. 2 corresponds to a longitudinal section view of the steam distributing body which forms part of above device.

Said distributing body 8 (see FIG. 2) has a collar 11 with a hole from which the duct 9 starts and said collar 11 is coupled inside a cylindric narrowing 12 of the body 8, provided with an annular cut which gives shape an also annular chamber 13, which communicates through one or several holes 13*a* with an internal recess 14 of same body 8 to which the duct 7 supplying water or steam converges, by a first end of the body 8.

In addition, there exists some annular grooves where respective sealing gaskets 15, 16 are arranged as well as an obturating element 17 threaded to the body 8 closing a second end thereof and provided with a spring 17*a* and a washer 17*b*.

Such constitution allows the rotation on an horizontal plane of the steam or water exit duct 9 from the body 8 or positioning the nozzle 21 selectively dispensing whipped milk close to the peaks 4, 4*a* for pouring coffee of the ladle-holder 5.

Said duct 9 ends in a portion surrounded by a clamp 18 arranged coaxial and rotatory with respect to the duct 9 from which an arm 19*a* starts toward the whipping device 19 with a nozzle 21 dispensing whipped milk, likewise rotatory, which internally produces Venturi effect between the steam inlet, the suction air controlled by a small valve with a driving wheel 20 and the inlet of milk from a flexible duct 22 connected to a container 23 thereof.

Figure 3:
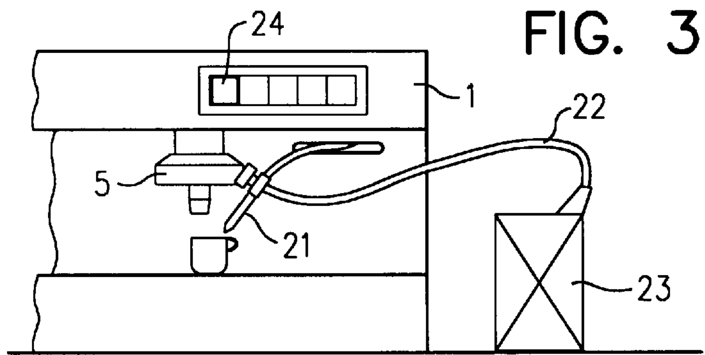
Figure 4:
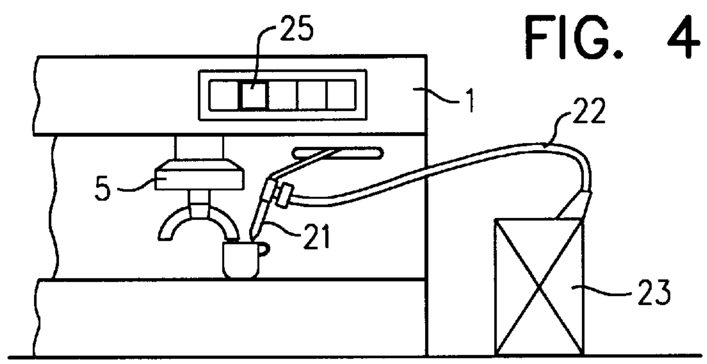
Figure 5:
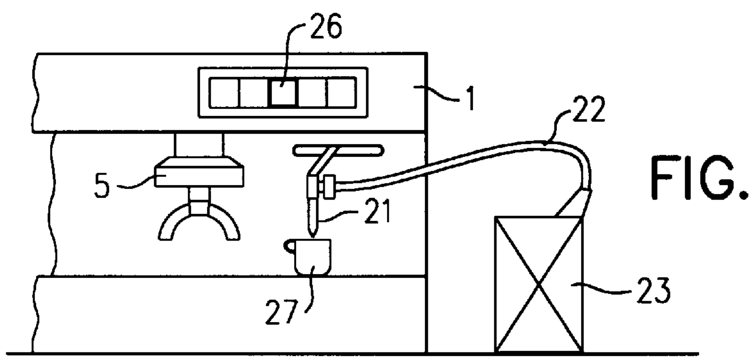
Figure 6:
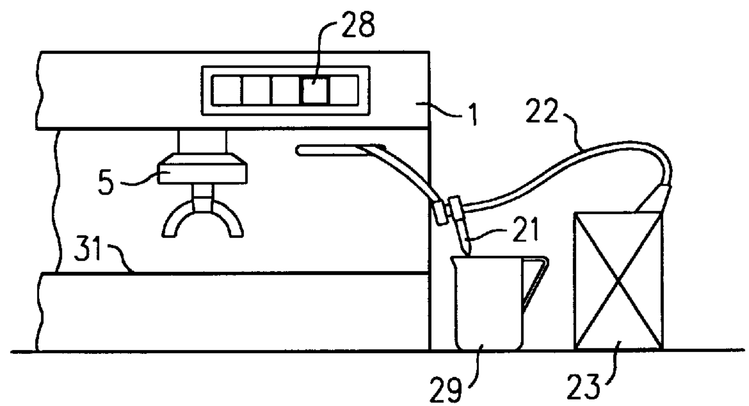

On the other hand, the electrically operated valve 2 is connected through an electronic circuit (not shown) which includes several adjustable timers, with a first and a second push buttons 24, 25 susceptible to make such electrically operated valve 2 acts in timed way for a simultaneous volumetrically controlled dispensing of coffee according two differentiated dosings (FIGS. 3 and 4). Also, a third push button 26 (FIG. 5) only activates the electrically operated valve 2, in a timed way, in the case of whipped milk supply to a cup 27 or container separated from the tray 31 of coffee dispensing and a fourth push button 28 activates said electrically operated valve with interlocking at a position of opening and continuous steam dispensing (FIG. 6) to supply whipped milk toward a jug or the like 29.

Figure 7:
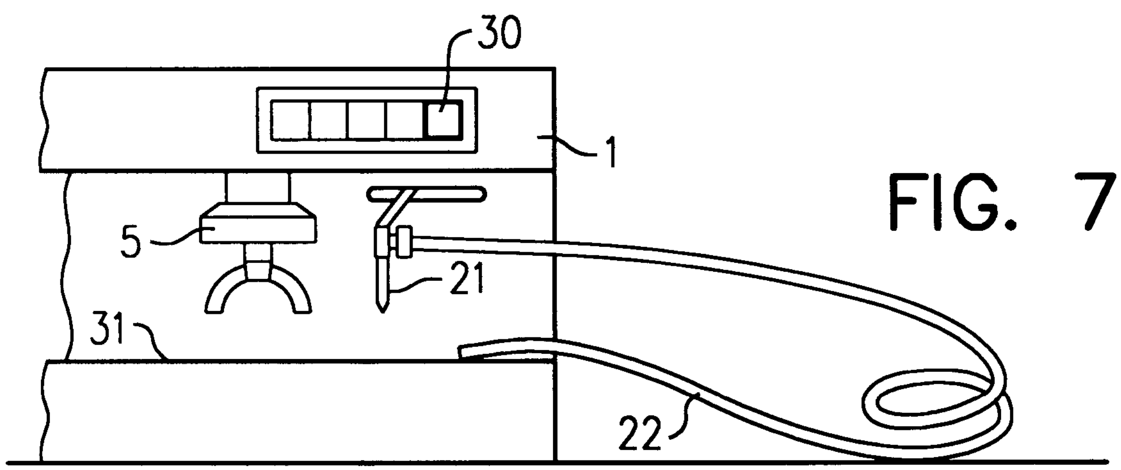
FIG. 7 shows, also schematically, the phase of performance of the device for the cleaning thereof.

In this invention, the possibility was also foreseen to clean the whole device (FIG. 7) consisting in disconnecting the flexible duct 22 from the container 23 and through a fifth push button 30, interrelated through the mentioned electronic circuit with the second electrically operated valve 3 of hot water intake from the drum 32, to provoke the interlocking thereof to a position of permanent opening and so let the hot water passes continuously along the whole device 19 and duct 22 of milk suction producing the cleaning thereof.

I claim:

1. In an espresso machine having a body, an espresso making portion, a steam source and a steam line communicating with said steam source, the improvement comprising:

a steam distributing body communicating with said steam line having a plurality of radially disposed internal openings, said steam distributing body having an external collar with a steam exhaust duct thereon, said steam exhaust duct in communication with said radially disposed internal openings, said external collar and said steam exhaust duct being rotatable in a substantially horizontal plane;

a clamp communicating with said steam exhaust duct, said clamp being rotatable in a substantially horizontal plane, said clamp having a steam egress arm thereof; and a milk foaming nozzle communicating with said steam egress arm of said clamp, said milk foaming nozzle having a milk ingress oriface and means for foaming milk, said milk foaming nozzle being rotatable in a substantially vertical plane such that said milk foaming nozzle has three degrees of freedom of movement.

2. The improvement of claim 1 wherein said milk foaming nozzle can be oriented adjacent said espresso making portion of said body to add foamed milk to an espresso drink, can be oriented on said body but remote from said espresso making portion to add foamed milk to a non-espresso containing cup and to pass steam through said milk foaming nozzle for cleaning, and can be oriented off of said body add foamed milk to a container having a height greater than a cup.

3. In an espresso machine having a body, an espresso making portion, a steam source and a steam line communicating with said steam source, the improvement comprising:

a steam distributing body communicating with said steam line and having a plurality of radially disposed internal openings, said steam distributing body having an external collar with a steam exhaust duct thereon, said steam exhaust duct in communication with said radially disposed internal openings, said external collar and said steam exhaust duct being rotatable in a substantially horizontal plane; and a clamp communicating with said steam exhaust duct, said clamp being rotatable in a substantially horizontal plane, said clamp having a steam egress arm thereon such that said steam egress arm has two degrees of freedom of movement.

4. The improvement of claim 3 further comprising:

a milk foaming nozzle communicating with said steam egress arm of said clamp, said milk foaming nozzle having a milk ingress oriface and means for foaming milk, said milk foaming nozzle being rotatable in a substantially vertical plane to provide said milk foaming nozzle with three degrees of freedom of movement.

5. The improvement of claim 4 wherein said milk foaming nozzle can be oriented adjacent said espresso making portion of said body to add foamed milk to an espresso drink; can be oriented on can be oriented on said body but remote from said espresso making portion to add foamed milk to a non-espresso containing cup and to pass steam through said milk foaming nozzle for cleaning, and can be oriented off of said body add foamed milk to a container having a height greater than a cup.

6. In an espresso machine having a body, an espresso making portion, a steam source and a steam line communicating with said steam source, the improvement comprising:

a steam distributing body communicating with said steam line and having a plurality of radially disposed internal openings, said steam distributing body having an external collar with a steam exhaust duct thereon, said steam exhaust duct in communication with said radially disposed internal openings, said external collar and said steam exhaust duct being rotatable in a substantially horizontal plane.

7. The improvement of claim 6 further comprising:

a clamp communicating with said steam exhaust duct, said clamp being rotatable in a substantially horizontal plane and having a steam egress arm; and a milk foaming nozzle communicating with said steam egress arm of said clamp, said milk foaming nozzle having a milk ingress oriface and means for foaming milk, said milk foaming nozzle being rotatable in a substantially vertical plane to provide said milk foaming nozzle with three degrees of freedom of movement.

8. The improvement of claim 7 wherein said milk foaming nozzle can be oriented adjacent said espresso making portion of said body to add foamed milk to an espresso drink; can be oriented on can be oriented on said body but remote from said espresso making portion to add foamed milk to a non-espresso containing cup and to pass steam through said milk foaming nozzle for cleaning, and can be oriented off of said body add foamed milk to a container having a height greater than a cup.

* * * * *